United States Patent [19]
Corum et al.

[11] Patent Number: 6,101,287
[45] Date of Patent: Aug. 8, 2000

[54] DARK FRAME SUBTRACTION

[75] Inventors: Curtis A. Corum; Kevin M. Connolly; Edward J. Bawolek, all of Chandler, Ariz.

[73] Assignee: Intel Corporation, Santa Clara, Calif.

[21] Appl. No.: 09/086,697

[22] Filed: May 27, 1998

[51] Int. Cl.$^7$ .............................. G06K 9/40; H04N 5/217
[52] U.S. Cl. ............................................. 382/274; 358/463
[58] Field of Search .................................. 358/448, 463, 358/529, 530, 535, 537; 382/274, 275

[56] References Cited

U.S. PATENT DOCUMENTS

| | | | |
|---|---|---|---|
| 4,200,934 | 4/1980 | Hofmann | 364/571 |
| 4,703,442 | 10/1987 | Levine | 364/521 |
| 4,739,495 | 4/1988 | Levine | 364/571 |

FOREIGN PATENT DOCUMENTS

| | | | |
|---|---|---|---|
| 729270 | 8/1996 | European Pat. Off. | H04N 5/217 |
| 729270A2 | 8/1996 | European Pat. Off. | H04N 5/217 |
| WO9962023 | 12/1999 | WIPO | G06K 9/40 |

*Primary Examiner*—Jerome Grant, II
*Attorney, Agent, or Firm*—Blakely, Sokoloff, Taylor & Zafman, LLP

[57] ABSTRACT

A method of adjusting a portion of a dark frame in accordance with compensation values related to dark reference pixels of a picture frame to obtain an adjusted dark frame portion, and then subtracting the adjusted dark frame portion from a corresponding picture frame portion. The technique may be used to improve the accuracy of image sensors such as those used in digital cameras or video conferencing cameras by compensating for dark current noise. The technique may be applied to both CMOS image sensors and, in general, to any image sensors requiring dark frame subtraction. The techniques may also be used in conjunction with calibration of image sensors and imaging systems.

22 Claims, 6 Drawing Sheets

$$F''_D = F'_D * \frac{\sum_i^N R_i / N}{\sum_i^N R'_i / N} \quad (1\text{-}1)$$

$$F_{P(corrected)} = F_P - F''_D \quad (1\text{-}2)$$

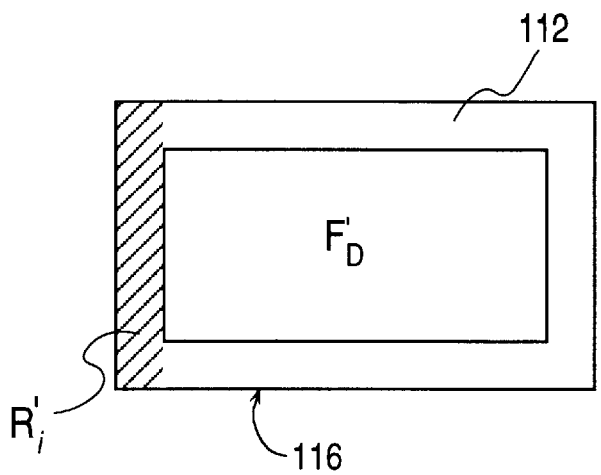
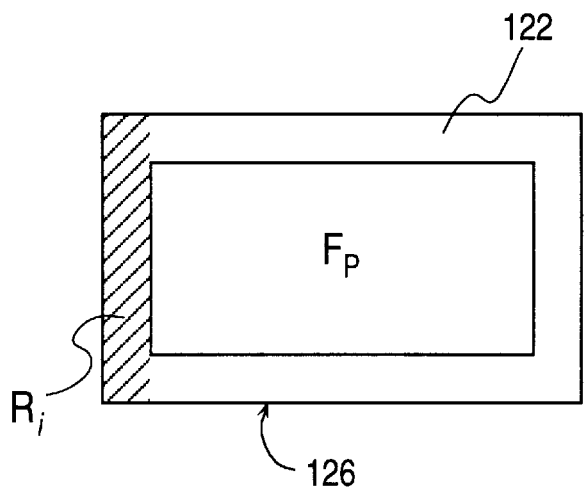
Fig. 1

210

Capturing a dark frame using an image sensor

220

Capturing a picture frame using the image sensor

230

Adjusting a portion $F'_D$ of the dark frame in accordance with compensation values related to dark reference pixels $R_i$ of the picture frame

240

Subtracting an adjusted dark frame portion $F''_D$ from a corresponding portion $F_P$ of the picture frame to obtain a corrected picture frame portion $F_{P(corrected)}$

250

Perform further processing or display of the corrected picture frame portion

Fig. 2

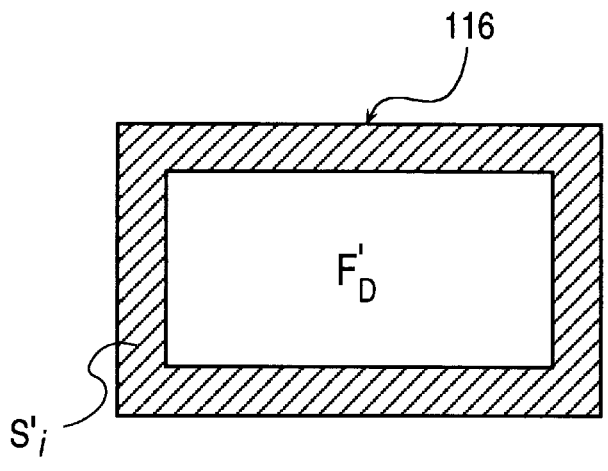
$$F_D^{'''} = F_D^{'} * \frac{\sum\limits_{i}^{M} S_i}{\sum\limits_{i}^{M} S_i^{'}} \qquad (3\text{-}1)$$
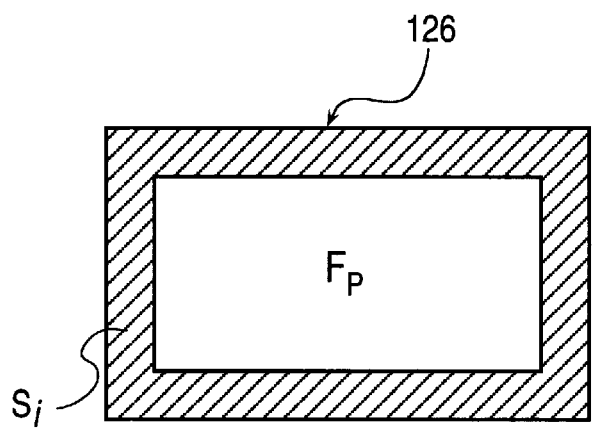
$$F_{P(corrected)} = F_P - F_D^{'''} \qquad (3\text{-}2)$$
Fig. 3

DARK FRAME SUBTRACTION

BACKGROUND INFORMATION

1. Field of the Invention

This invention is generally related to electronic imaging systems and more particularly to techniques for correcting the response of image sensors.

2. Description of Related Art

Electronic imaging is becoming increasingly popular as imaging systems such as the digital camera and personal computer (PC) provide consumers with the ability to capture digital images and movies in a low cost manner and display and communicate them to others using a PC and a network. Another part of the appeal of electronic imaging lies in its ability to electronically correct for imperfections in a captured image from an expected standard. These imperfections are often caused by the realities of manufacturing an imaging system which is to conform with an expected specification.

Non-idealities in the imaging system can cause deviations in the response of the system. To correct such deviations, a conventional calibration procedure may be performed to electronically adjust the system response to match the expected response.

In one such technique, the imaging system is exposed to known color stimuli, such as a Macbeth color chart, to produce picture frames (containing images) of the stimuli. Each picture frame comprises a number of digital pixel values each one being associated with a sensor circuit element in a semiconductor image sensor. The picture frames are then compared to an expected specification, and calibration factors related to differences between the actual and expected values are computed. The calibration factors are then applied to subsequent picture frames taken using the same image sensor to result in images having more accurate color content.

In addition to manufacturing process variations, thermal processes and defects within the semiconductor structures that make up the image sensor can also cause subtle deviations in the response of an imaging system. These deviations are referred to herein as dark offset noise. Contributors to the dark offset noise are leakage currents (dark currents) and circuit offsets in each sensor circuit element of the image sensor. The dark offset noise permeates each picture frame.

The leakage currents and hence the dark offset noise can be represented by a dark frame separate from the picture frame captured by the image sensor. Most imaging systems such as digital cameras attempt to cancel the dark offset noise, to a first order, by simply subtracting the dark frame from the picture frame to obtain a corrected frame. The picture frame is an image of the desired scene, and the dark frame is another image obtained with the same camera but with the camera's mechanical shutter being closed so that no light is incident on the image sensor. The subtraction improves the quality of the image in the corrected frame by canceling, to a limited order, the dark offset noise from the picture frame. The noise would otherwise result in speckles or graininess appearing in the uncorrected picture frame.

The conventional dark current subtraction technique described above may be combined with conventional calibration techniques to achieve somewhat improved accuracy in calibration. However, such a technique fails to provide sufficiently accurate and repeatable results from a measurement capability analysis of calibration schemes used with complimentary metal oxide semiconductor (CMOS) image sensors. It is desirable, therefore, to further improve the accuracy and repeatability of calibration for image sensors.

SUMMARY

The invention in one embodiment is directed at a method of adjusting at least one portion of a dark frame in accordance with compensation values related to dark reference pixels of a picture frame. The dark frame and the picture frame were obtained from the same image sensor. This yields an adjusted dark frame portion which is then subtracted from a corresponding portion of the picture frame to obtain a corrected picture frame.

BRIEF DESCRIPTION OF THE DRAWINGS

FIG. 1 presents a framework for an embodiment of the invention.

FIG. 2 illustrates a series of operations to be performed in the framework of FIG. 1.

FIG. 3 illustrates a technique of obtaining an adjusted dark frame according to a another embodiment of the invention.

DETAILED DESCRIPTION

Figure 4:
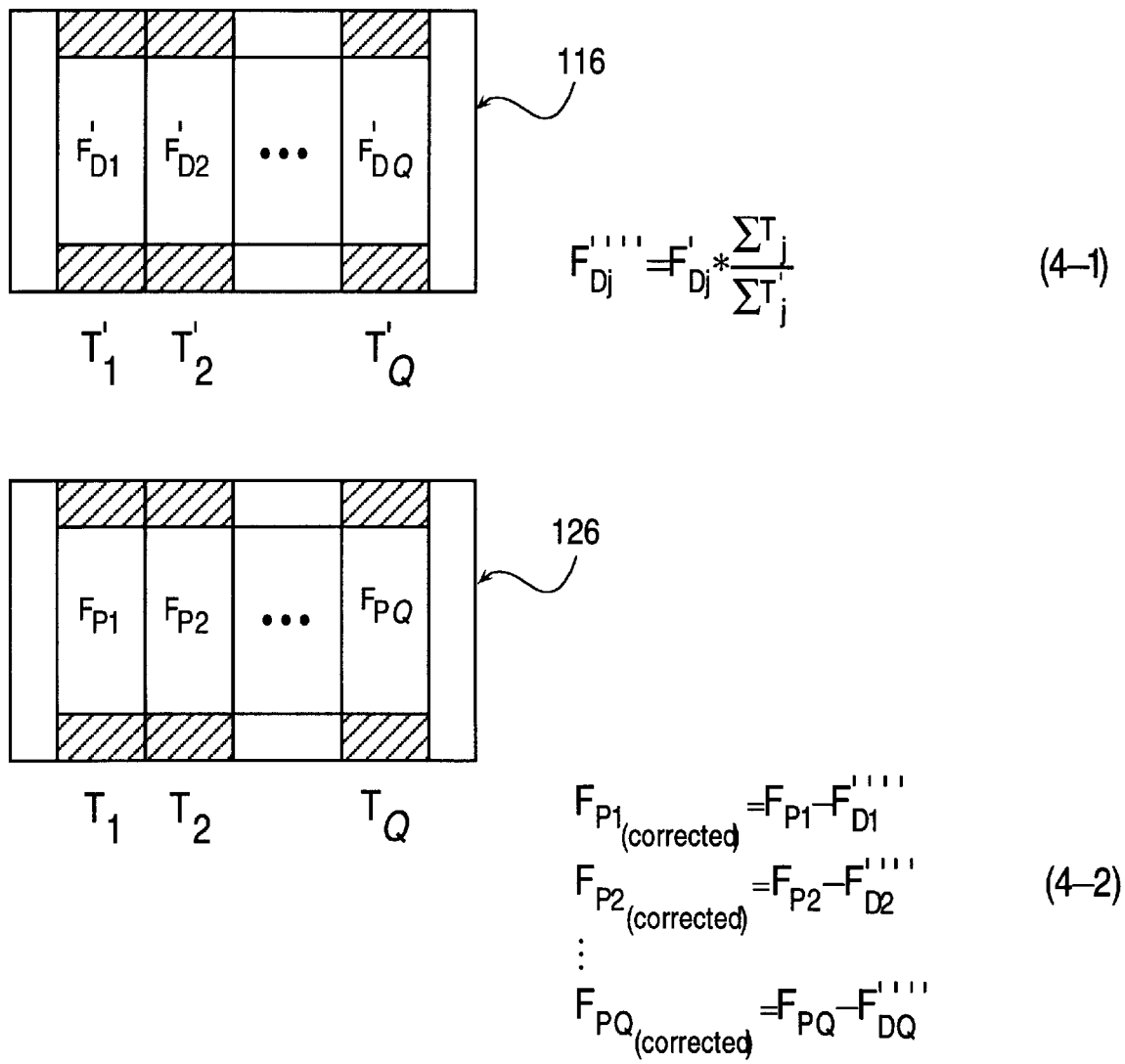
FIG. 4 illustrates a technique for obtaining an adjusted dark frame according to yet another embodiment of the invention.

As briefly summarized above, the invention in one embodiment is a method for improving the accuracy of manufacturing test and calibration, as well as improving the performance of image sensors and imaging systems, by subtracting a better estimate of an ideal dark frame from the picture frame. The ideal dark frame is a hypothetical frame that would be captured at the same time as the picture frame. In practice, however, the dark and picture frames are captured at different times. Even a one second time difference between the frames causes the temperature of the image sensor to change which in turn causes the dark frame to contain substantial errors with respect to the ideal dark frame. The temperature change is particularly strong in sensors having integrated functions, such as CMOS image sensors.

To obtain a more accurate estimate of the ideal dark frame, the dark frame is adjusted based on compensation values related to dark reference pixels in a picture frame captured using the same image sensor. Since the dark reference pixels are captured at the same time as the rest of the picture frame, they may be considered to be part of the ideal dark frame and may therefore be used to better estimate the ideal dark frame.

FIGS. 1 and 2 illustrate an embodiment of the invention as a method of improving the accuracy of the response of an image sensor by performing an adjusted dark frame subtraction. In FIG. 1, two frames are shown, a dark frame 116 and a picture frame 126. These frames are obtained from the same image sensor in no particular order. Each frame contains a number of reference pixels 112 in the dark frame and 122 in the picture frame that are typically situated in the periphery of each frame. These are known as dark reference pixels generated by sensor elements that are not exposed to any incident light.

The picture frame 126 includes a portion $F_P$ which in this embodiment represents the entire image of a scene captured using the image sensor. The sensor elements that produced $F_P$ also produce $F_D'$ of the dark frame 116 in a different exposure. A pixel in $F_D'$ contains a contribution from "dark electrons" only, whereas the corresponding pixel in $F_P$ contains contributions from dark electrons as well as photogenerated electrons of the same sensor element. However, due to differences in temperature that develop in the image sensor between the time at which the picture frame 126 is captured and the time at which the dark frame 116 is captured, the contribution from dark electrons is different in the two corresponding pixels.

To help compensate for such a difference, the pixel in $F_D'$ is adjusted in accordance with a compensation value that is related to dark reference pixels $R_i$ in the picture frame 126. This is represented as equation (1-1) in the embodiment of FIG. 1. An adjusted dark frame portion $F''_D$ is given by multiplying the dark frame portion $F_D'$ by a ratio of the sum of N corresponding dark reference pixels $R'_i$ in the dark frame and $R_i$ in the picture frame 126. The adjusted dark frame portion $F''_D$ may be viewed as a better estimate of the hypothetical ideal dark frame. Once the portion $F'_D$ has been adjusted, the adjusted dark frame $F''_D$ is subtracted from its corresponding picture frame portion $F_P$ to yield a corrected picture frame portion $F_{P(corrected)}$ as indicated in equation (1-2).

FIG. 2 summarizes the steps performed in one embodiment of the invention using the framework of FIG. 1 described above. Operation would normally begin with step 210 in which the dark frame 116 is captured using an image sensor. Operation continues with step 220 in which the picture frame 126 is captured using the same image sensor. Thereafter, operation continues with step 230 in which a portion of the dark frame is adjusted according to compensation values that are related to the dark reference pixels $R_i$ of the picture frame. This yields an adjusted dark frame portion $F''_D$ which is then subtracted from a corresponding portion $F_P$ of the picture frame to obtain a corrected picture frame portion. The corrected picture frame will thus receive the benefit of an improved estimate for the ideal dark frame. Operation may continue with step 250 in which further processing or display of the corrected picture frame portion may be performed. For instance, the corrected picture frame may be particularly useful in improving the accuracy of color calibration of image sensors. In such a scenario, the corrected picture frame will be used to determine a color calibration matrix for the image sensor. The effect of subtracting an improved estimate of the dark frame may be appreciated by performing a measurement capability analysis upon the color calibration scheme using known techniques in the art.

The corrected picture frame portion may also be useful in improving the accuracy of detecting dead pixels. Reducing the error in the dark frame portion $F'_D$ that is subtracted from the picture frame portion $F_P$ helps better identify those pixels in $F_P$ that are truly dead, i.e., have pixel values that are either extremely high or extremely low.

The dark reference pixels $R_i$ in the embodiment of FIG. 1 form at least one column of pixels in the picture frame 126. Normally, two or three columns are used for $R_i$, where the selected columns are in the middle of a group of dark reference columns. The middle columns are selected to avoid the possibility of using pixels generated by exposed sensor circuit elements near the boundary with $F_P$. Thus, for an image sensor with a maximum resolution of 1024×768, N in equation (1-1) of FIG. 1 would be approximately several thousand.

As one alternative to the columns of $R_i$, FIG. 3 shows a group of dark reference pixels $S_i$ which include both rows and columns that form a boundary around the portion $F_P$. In this embodiment, the compensation values are related to a sum of dark reference pixels $S_i$ as indicated in equation (3-1). This results in adjusted frame portion $F'''_D$ which is also subtracted from its corresponding picture frame portion $F_P$ to give a corrected picture frame portion as indicated in equation (3-2).

In yet another embodiment shown in FIG. 4, the dark reference pixels are formed as a number of portions $T_1$, $T_2$, ..., $T_Q$. In that case, the dark frame 116 is divided into portions $F'_{D1}$, $F'_{D2}$, ..., $F'_{DQ}$, where each respective portion $F'_{Dj}$ is adjusted based on compensation values related to the respective reference pixels $T_j$ as indicated in equation (4-1). Once all of the portions $F'_{Dj}$ have been adjusted, each is separately subtracted from its corresponding picture frame portion $F_{Pj}$ as indicated in (4-2) to obtain the respective corrected picture frame $F_{Pj(corrected)}$. By treating the dark frame 116 in this way, errors in the dark frame 116 that were caused by a temperature gradiant across the image sensor may be reduced.

If segmenting the picture frame 126 as in FIG. 4 were to result in a corrected picture frame having seams in the boundary between the adjacent corrected portions $F_{Pj(corrected)}$, such seams may be removed by, for instance, applying a DC matching algorithm to the adjacent corrected portions. For instance, a known DC matching algorithm such as one used in Joint Photographic Experts Group (JPEG) extensions may be used that allows the boundary between adjacent corrected portions to line up with a JPEG macro block.

This disclosure so far has described techniques for reducing errors in the dark frame 116 that may have been caused by a temperature difference in the image sensor between the time at which the picture frame was captured and the time at which the dark frame is captured. The embodiment of FIG. 4 in particular also addresses errors caused by a temperature gradient across the image sensor. Yet a third contribution to the error in the dark frame 116 is random noise. Random noise results in random pixels having random deviations in their values in both the dark frame and the picture frame. In contrast with the errors caused by a temperature difference or temperature gradient, random noise errors in general cannot be suppressed or corrected for using the adjusted dark frame subtraction techniques described above. However, in order to further reduce random noise in the dark frame, those techniques may be combined with a technique that uses a greater integration or exposure time for obtaining $F'_D$ as compared to $F_P$.

To help further alleviate random noise, the embodiments of FIGS. 1–4 above may be modified so that the integration time used to obtain the dark frame 116 is longer than the integration time for the picture frame 126. The methods described above otherwise remain identical except for an additional step of adjusting $F'_D$ in accordance with second compensation values that are related to the longer integration time associated with the dark frame. For instance, the adjusted dark frame portion $F''_D$ in equation (1-1) of FIG. 1 is further adjusted as follows:

$$F'''_D = F''_D \times \frac{t}{t'}, t' > t$$

where t is the integration time used to obtain the picture frame 126 and t' is the longer integration time of the corresponding pixels in the dark frame 116.

Figure 5:
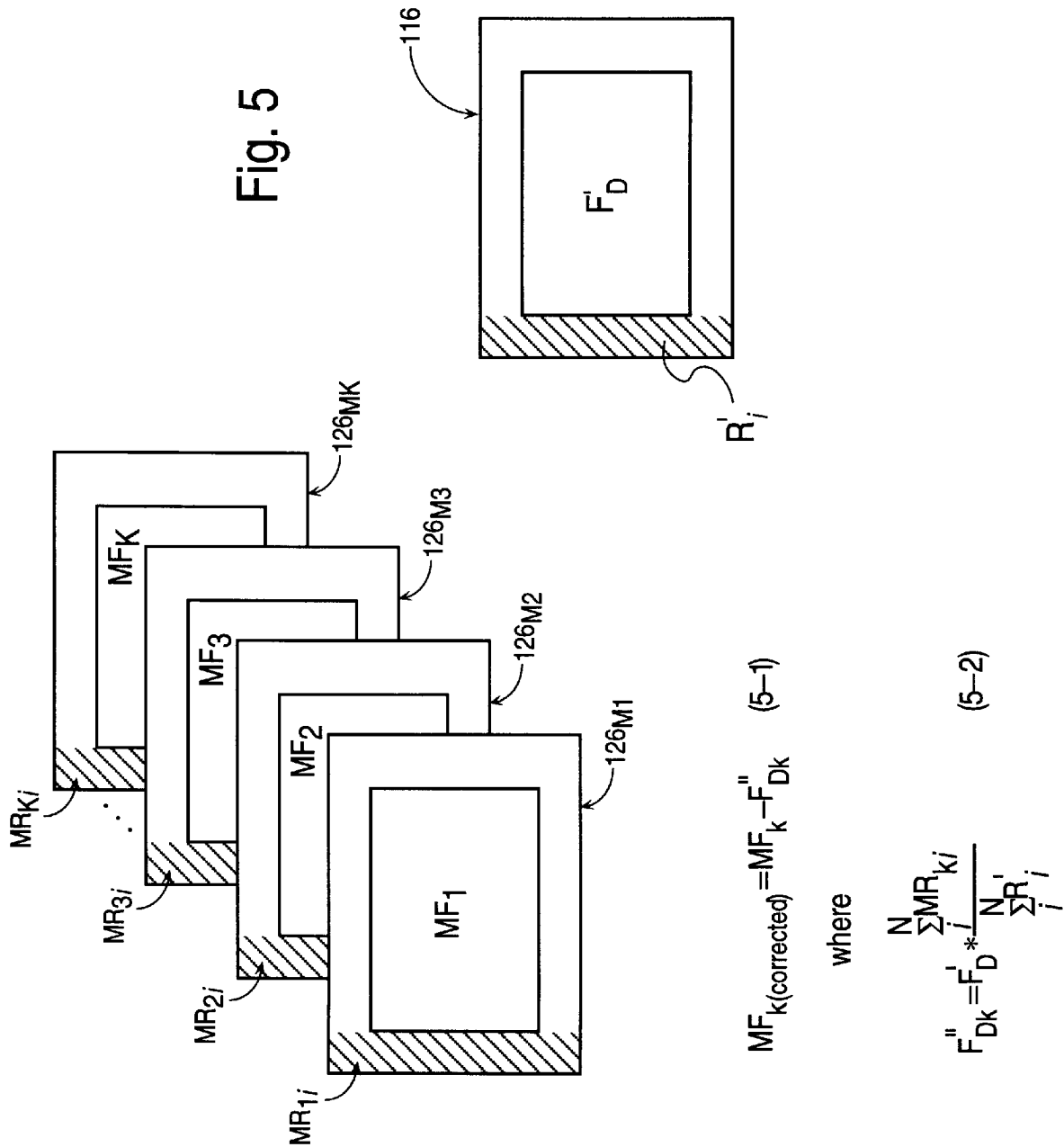
FIG. 5 illustrates a technique for obtaining adjusted movie frames according to an embodiment of the invention.

So far this disclosure has been referring to a single picture frame and a single dark frame when describing the various embodiments of the invention. FIG. 5 shows another embodiment of the invention particularly applicable to a sequence of picture frames $126_{M1}$, $126_{M2}$, ... that may be used to capture motion in the scene. The principles that were discussed with the single frame embodiments above may be extended to a sequence of multiple picture frames. In FIG. 5, a series of separate motion frames $MF_k$ are shown that are captured by the same image sensor. The frames $MF_k$ are corrected by subtracting an adjusted dark frame $F''_{Dk}$ as indicated in (5-1). In this embodiment, a single dark frame $116_D$ is obtained by the same image sensor that captures the motion frames. Each adjusted dark frame portion $F''_{Dk}$ is obtained by adjusting $F'_D$ in accordance with compensation values related to the dark reference pixels $MR_{ki}$ of the respective motion frame $126_{Mk}$, as indicated in (5-2). Thereafter, the adjusted dark frame portions $F''_{Dk}$ are subtracted from the respective $MF_k$ to obtain the corrected motion frame portion $MF_{k(corrected)}$.

As an alternative to using a single dark frame 116, more than one dark frame may be captured and used with the motion frames $126_{Mk}$. For instance, a separate dark frame can be captured and used to adjust every five motion frames. In this way, the ideal dark frame may be better estimated (as the temperature of the image sensor changes with successive frames) by keeping the dark frame and its associated motion frames closer to each other in time, and therefore closer in temperature.

Figure 6:
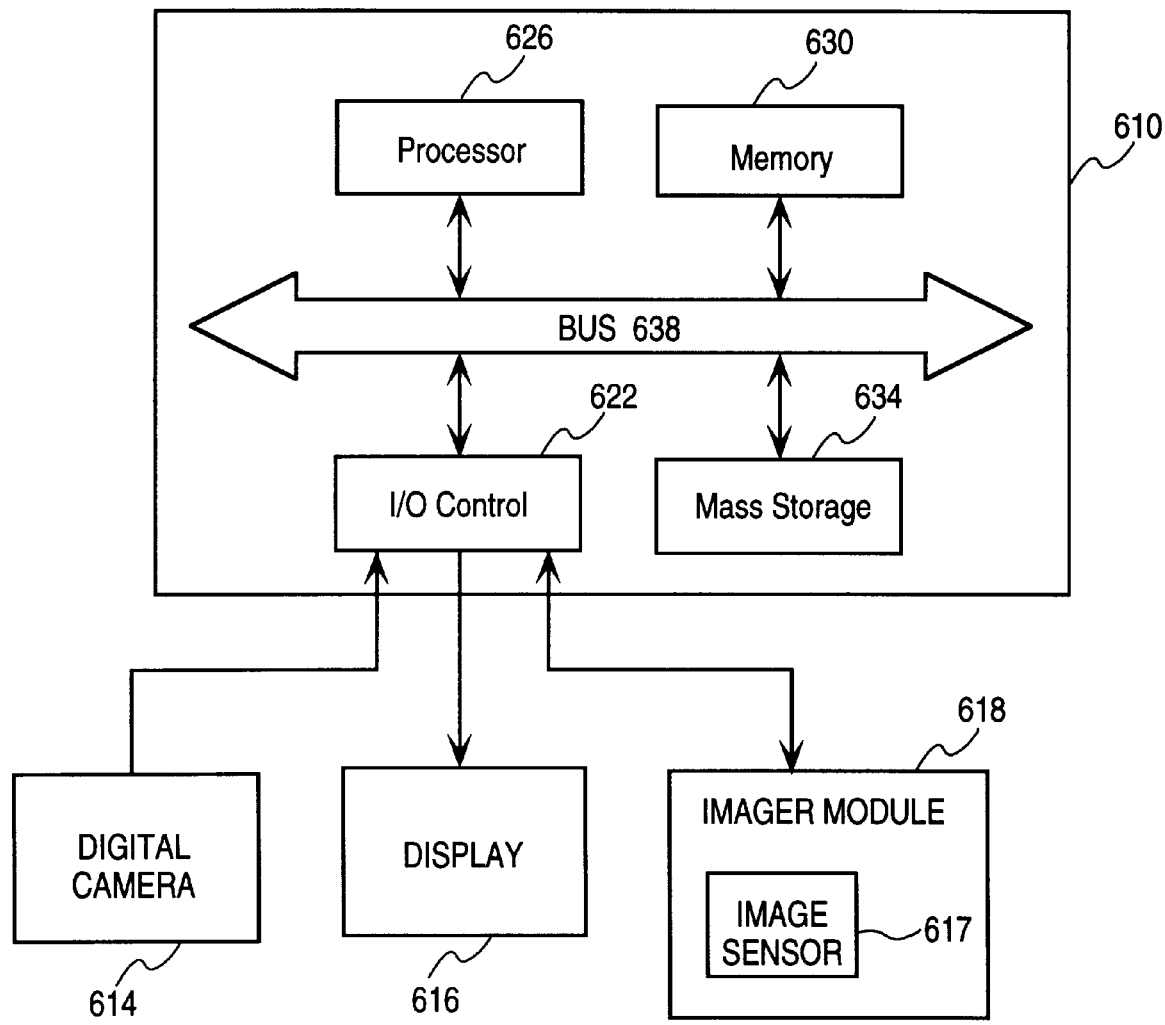
FIG. 6 illustrates a block diagram of an image processing system as another embodiment of the invention.

FIG. 6 illustrates several embodiments of the invention as apparatuses that are part of an imaging system. In one embodiment, an imager module 618, such as one provided to an original equipment manufacturer of digital cameras, may be equipped with logic circuitry such as an application specific integrated circuit (ASIC) that is configured to perform steps 210–240 of FIG. 2 in improving the accuracy of the response of the image sensor 617 aboard the module. The corrected picture or motion frames are transferred to a processing system 610 by means of a removable non-volatile storage device or a computer peripheral bus (e.g., Universal Serial Bus). The corrected picture frames may then be further processed and used according to known techniques, such as for color calibration purposes or image processing prior to display.

As an alternative to the application specific logic circuitry, a programmed processor may be used to perform the steps of adjusting the dark frames and performing the subtraction from the picture frames. In that case, the imager module 618 or digital camera 614 would include an article comprising a machine readable medium such as semiconductor memory that includes instructions which when executed by the processor cause the steps of FIG. 2 to be performed.

In the above described imager module and digital camera embodiments of the invention, the picture or motion frames were first corrected and then transferred to the processing system 610 being, for example, a computer. Alternatively, the correction may be performed by the image processing system 610. In that case, the system 610 is configured to perform the steps of FIG. 2 upon receiving uncorrected dark and picture frames from the imager module 618 or digital camera 614. In that embodiment, the memory 630 and/or the mass storage device 634 (e.g., hard disk drive) would include instructions that when executed by the processor 626 cause the uncorrected dark and picture frames to be transferred into the system 610 through the I/O control device 622 (e.g., USB controller) before being adjusted and subtracted as in FIGS. 1–5.

The embodiments of the invention described above are, of course, subject to other variations in structure and implementation. For instance, although the adjusted dark frame subtraction techniques described above may be particularly useful to compensate for dark current noise in CMOS sensors, the techniques may be applied to alleviate the undesirable effects of dark currents in other types of image sensors such as infrared thermal imaging and charge coupled device (CCD) sensors. In general, the scope of the invention should be determined not by the embodiments illustrated but by the appended claims and their legal equivalents.

What is claimed is:

1. A method comprising:

multiplying at least one portion of a dark frame by compensation values related to dark pixels of a picture frame to obtain an adjusted dark frame portion, the dark frame and the picture frame having been obtained from the same image sensor; and subtracting the adjusted dark frame portion from a corresponding portion of the picture frame to obtain a corrected picture frame.

2. The method of claim 1 wherein the compensation values are related to a ratio of a sum of the dark pixels in the picture frame to a sum of corresponding pixels in the dark frame.

3. The method of claim 1 wherein the dark pixels form at least one column of pixels in the picture frame.

4. The method of claim 1 wherein the multiplying comprises adjusting a plurality of portions of the dark frame in accordance with compensation values related to the dark pixels to obtain a plurality of adjusted dark frame portions, and wherein the step of subtracting comprises subtracting the plurality of adjusted dark frame portions from a corresponding plurality of portions of the picture frame to obtain a plurality of corrected portions.

5. The method of claim 4 further comprising removing any seams between the plurality of corrected portions.

6. The method of claim 1 further comprising adjusting the dark frame in accordance with second compensation values related to integration times used in obtaining the picture frame and the dark frame, the integration time for the dark frame being longer than the integration time for the picture frame.

7. The method of claim 1 further comprising generating a color calibration matrix for the image sensor based upon the corrected picture frame.

8. The method of claim 1 further comprising detecting dead pixels in the corrected picture frame.

9. A method comprising:

generating a plurality of adjusted dark frame portions based on a dark frame and a plurality of respective picture frames, each adjusted dark frame portion being obtained by multiplying a portion of the dark frame by compensation values related to dark pixels of the respective picture frame, the respective picture frames and the dark frame having been obtained using the same image sensor; and subtracting the plurality of adjusted dark frame portions from the plurality of respective picture frames to obtain a plurality of corrected picture frames.

10. An imager comprising an image sensor; and logic circuitry configured to multiply at least one portion of a dark frame by compensation values related to dark pixels of a picture frame to obtain an adjusted dark frame portion, the dark frame and the picture frame having been obtained from the image sensor, and subtract the adjusted dark frame portion from a corresponding portion of the picture frame to obtain a corrected picture frame.

11. The imager of claim 10 further comprising means for transferring the corrected picture frame to an image processing system.

12. The imager of claim 10 further comprising removable non-volatile storage device for transferring the corrected picture frame to an image processing system.

13. The imager of claim 10 wherein the compensation values are related to a ratio of a sum of the dark pixels in the picture frame to a sum of corresponding pixels in the dark frame.

14. The imager of claim 10 wherein the logic circuitry is further configured to adjust the dark frame in accordance the second compensation values related to integration times used in obtaining the picture frame and the dark frame, the integration time for the dark frame being longer than the integration time for the picture frame.

15. An article comprising:

a machine-readable medium having instructions that when executed by a processor cause:

multiplying at least one portion of a dark frame in by compensation values related to dark pixels of a picture frame to obtain an adjusted dark frame portion, the dark frame and the picture frame having been obtained from the same image sensor; and subtracting the adjusted dark frame portion from a corresponding portion of the picture frame to obtain a corrected picture frame.

16. The article of claim 15 wherein the machine-readable medium has further instructions that when executed by the processor further cause generating the compensation values as being related to a ratio of a sum of the dark pixels in the picture frame to a sum of corresponding pixels in the dark frame.

17. The article of claim 15 wherein the dark pixels form at least one column of pixels in the picture frame.

18. The article of claim 15 wherein the machine-readable medium has further instructions that when executed by the processor further cause adjusting the dark frame in accordance with second compensation values related to integration times used in obtaining the picture frame and the dark frame, the integration time for the dark frame being longer than the integration time for the picture frame.

19. The article of claim 15 wherein the machine-readable medium has further instructions that when executed by the processor cause the multiplying to comprise adjusting a plurality of portions of the dark frame in accordance with compensation values related to the dark pixels to obtain a plurality of adjusted dark frame portions, and the subtracting to comprise subtracting the plurality of adjusted dark frame portions from a corresponding plurality of portions of the picture frame to obtain a plurality of corrected portions.

20. The article of claim 19 wherein the machine-readable medium has further instructions that when executed by the processor further cause removing any seams between the plurality of corrected portions.

21. The article of claim 15 wherein the machine-readable medium has further instructions that when executed by the processor further cause generating a color calibration matrix for the image sensor based upon the corrected picture frame.

22. The article of claim 15 wherein the machine-readable medium has further instructions that when executed by the processor further cause detecting dead pixels in the corrected picture frame.

* * * * *